United States Patent [19]
Kuck

[11] 3,774,981
[45] Nov. 27, 1973

[54] INSERT FOR SETTING ARMATURE SHAFT END POSITION

[75] Inventor: Lloyd L. Kuck, Dayton, Ohio

[73] Assignee: General Motors Corporation, Detroit, Mich.

[22] Filed: Nov. 2, 1972

[21] Appl. No.: 303,194

[52] U.S. Cl. .............................................. 308/166
[51] Int. Cl. .............................................. F16c 25/00
[58] Field of Search .................................... 308/166

[56] References Cited
FOREIGN PATENTS OR APPLICATIONS
297,011  9/1928  Great Britain ..................... 308/166

Primary Examiner—Charles J. Myhre
Assistant Examiner—Frank Susko
Attorney—W. S. Pettigrew et al.

[57] ABSTRACT

In a preferred form, this disclosure relates to a plastic thrust bearing for engaging and setting the axial end position of an armature shaft of a dynamo-electric machine. The thrust bearing comprises a generally cylindrical plug which is adapted to be inserted within a threaded opening in a housing containing the armature shaft until its forward end thereof abuttingly engages the end of the armature shaft and an insert or wedge integrally connected to the plug via fracturable webs. The plug is bifurcated to provide a pair of spaced legs and the wedge is adapted to be driven between the legs to radially expand the same and cause the teeth of the threaded opening to bite into the legs to securely retain the thrust bearing in place.

2 Claims, 5 Drawing Figures

PATENTED NOV 27 1973 3,774,981

INSERT FOR SETTING ARMATURE SHAFT END POSITION

The present invention relates to a thrust bearing for engaging and setting the axial end position of an armature shaft of a dynamo-electric machine.

In actuating mechanisms for use in actuating components of automotive vehicles, it is common to provide an electric motor or dynamo-electric machine having a rotatable armature shaft which carries a worm gear in meshed engagement with a worm wheel to provide a gear reduction. In such mechanisms, it is also common to provide a unitary housing for both the electric motor and the reduction gear of gears. In order to prevent axial end play of the armature shaft, a thrust bearing carried by the housing and in abutting engagement with the armature shaft is usually provided. Heretofore, thrust bearings in the form of set screws in threaded engagement with an aligned threaded opening in the housing and which are locked in place by a lock nut have been employed. It is also known in the prior art to use a plastic set screw in threaded engagement with an aligned threaded opening in the housing. The set screw contained a central hexagonal opening to enable an "Allen" wrench to rotate the same until it abuttingly engaged the end of the armature shaft. The set screw was thereafter locked in place by a separate tapered drive pin driven into the opening. The latter type of thrust bearing is shown in U. S. Pat. No. 2,976,088, which is assigned to the same assignee as the present invention.

The present invention is directed to a new and improved thrust bearing for the above-noted purpose. Accordingly, an important object of the present invention is to provide a new and improved thrust bearing for engaging and setting the axial end position of an armature shaft of a dynamo-electric machine and which is of a simple and economical construction and which can be readily positioned within a threaded opening of a housing and then locked in place.

A further object of the present invention is to provide a new and improved thrust bearing for engaging and setting the axial end position of an armature shaft of a dynamo-electric machine having a housing means provided with a threaded opening aligned with and adjacent to the end of the armature shaft, and in which the thrust bearing is of a one-piece construction and comprises a plug which is slidably receivable through the threaded opening until its forward end engages the end of the armature shaft and an integral insert or wedge integrally connected with a bifurcated end portion of the plug member by fracturable webs, the thrust bearing being secured to the housing by driving the wedge between the bifurcated legs to cause the legs to be radially expanded and the teeth of the threaded opening to bite or embed into the plug portion to lock the same in place.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals or characters are employed to designate corresponding parts throughout the several views, and in which.

Figure 1:
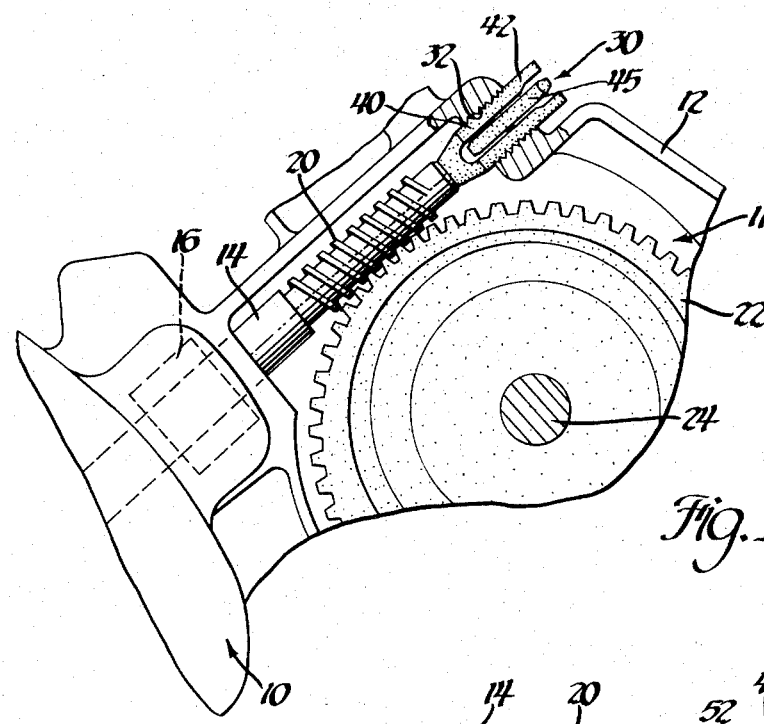
FIG. 1 is a fragmentary plan view, with portions shown in section, of a dynamo-electric machine and gear reduction unit embodying the present invention.
Figure 2:
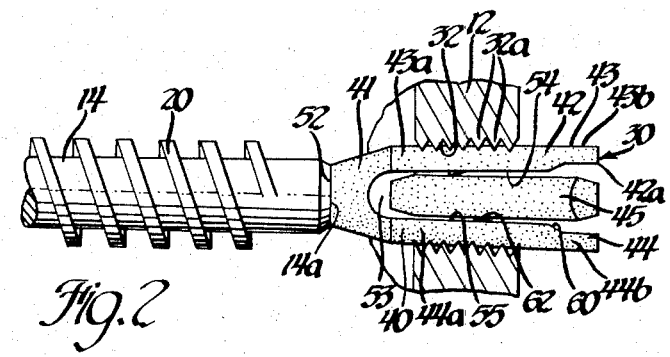
FIG. 2 is a side elevational view of the thrust bearing of the present invention and showing the same assembled in place.
Figure 3:
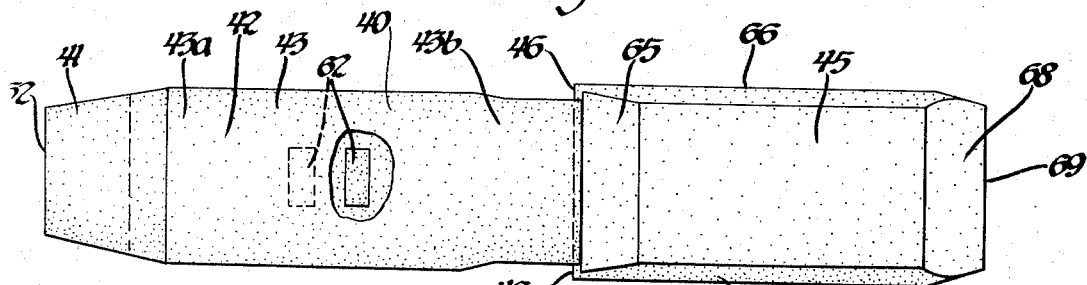
FIG. 3 is a top plan view of the thrust bearing of the present invention prior to assembly.
Figure 4:
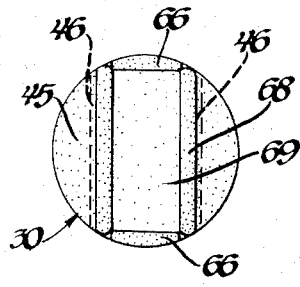
FIG. 4 is an end view of the thrust bearing shown in FIG. 3.

As representing a preferred embodiment of the present invention, FIG. 1 shows a dynamo-electric machine or electric motor 10 and gear reduction unit 11 which could be of any suitable or conventional construction. The motor 10 and unit 11 have a common metal housing means 12. The motor 10 has a rotatable armature shaft 14 which is suitably supported intermediate its ends and adjacent its left end, as view in FIG. 1, by bearings 16 (only one of which is shown). The armature shaft 14 has an integral worm gear 20 thereon which is in meshed driving engagement with a worm wheel 22 secured to an output shaft 24 which is rotatably supported by the housing 12. The armature shaft 14 when rotated, rotates the worm wheel 22 which in turn rotates the output shaft 24. The output shaft 24 is adapted to be operatively connected with a component of an automotive vehicle, such as the windshield wipers.

In accordance with the provisions of the present invention, a novel thrust bearing 30 for engaging and setting the axial end position of the armature shaft 14 is provided. The bearing 30 is adapted to be received within a threaded opening 32 in the housing 12 which is aligned with the armature shaft 14. The bearing 30 is of a one-piece construction and is made from a suitable plastic material, such as nylon.

The thrust bearing 30 broadly comprises a generally cylindrical plug 40 having a tapered forward portion 41 and a bifurcated rearward end portion 42 defining a pair of spaced legs 43 and 44 and an insert or wedge 45 integrally connected with the legs 43 and 44 by fracturable webs 46. The forward end portion 41 of the plug 40 has a diameter which progressively decreases proceeding from the rearward end portion 42 of the plug towards its forwardmost end surface 52. The legs 43 and 44 have curved outer peripheral surfaces which lie on a circumscribed circle having a diameter which is no greater than the internal diameter of the threads 32a of the threaded opening 32. The legs 43 and 44 are at diametral opposite locations and define a through transverse or diametral slot 53 extending axially from its rearwardmost end 42a to a location intermediate the ends of the forward end portion 41 of the plug 40.

The legs 43 and 44 have flat or planar inner surfaces 54 and 55 which lie in planes which are parallel to each other. The legs along their forward sections 43a, 44a are transversely spaced apart a distance T and are spaced apart a slightly greater distance adjacent their rearward sections 43b, 44b. The legs 43, 44 define a tapered surface 60 at the juncture of their forward and rearward sections. Also, the legs are provided with linearly tapered nibs 62 intermediate their ends which extend inwardly into the slot 53 from the inner surfaces 54 and 55. These nibs are generally triangular in shape, as viewed in FIG. 5, and with the thickness of the nibs progressively increasing proceeding from their rightmost end towards their leftmost ends, as viewed in FIG. 5.

Figure 5:
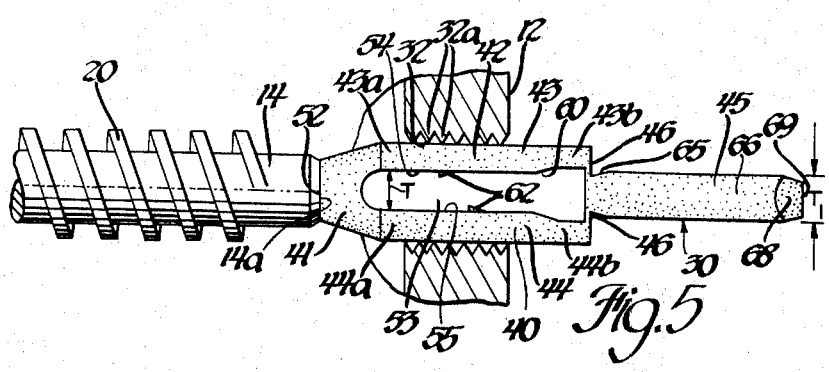
FIG. 5 is a view like that shown in FIG. 2, but showing the thrust bearing prior to being assembled in place.

The wedge 45 is of a generally rectangular cross sectional shape and has a width which is less than the internal diameter of the threads 32a of the threaded opening 32 and a thickness $T_1$, which is greater than the transverse distance T of the slot 53. The wedge 45 has a linearly tapered forward portion 65 to facilitate entry within the slot 53 between the legs 43 and 44. The tapered forward portion 65 has a thickness which progressively decreases proceeding from its rightmost end towards its leftmost end, as shown in FIG. 5. The tapered forward portion at its leftmost end is integrally connected with the legs 43 and 44 via the fracturable webs 46. The wedge 45 has curved sides 66 which lie on a circumscribed circle which is less than the internal diameter of the threads 32a of the threaded opening 32. The wedge 45 also has a linearly tapered rearward portion 68 which terminates in a planar rearward end 69.

The thrust bearing 30 is positioned within the housing 12 by inserting the plug 40 through the threaded opening 32 until its forward end 52 abuts the tapered forward end 14a of the armature shaft 14. After the plug is so positioned, the wedge 45 is driven into the slot 53 between the legs 43 and 44. The wedge 45 is driven into the slot 53 by applying an axial force in excess of the predetermined magnitude against its right end 69 to cause the webs 22 to fracture and the wedge 45 to move within the slot 53. As the wedge 45 is received within the slot 53, it will engage the legs 43 and 44 and the tapered nibs 62 and cause the legs 43 and 44 to be radially expanded. As the legs are radially expanded, the threads 32a defining the opening 32 will bite into and embed within the plastic legs 43 and 44 to securely lock the plug in place relative to the housing 12. The tapered forward end 65 facilitates entry of the wedge 45 within the slot 53 and the tapered nibs 62 cause the legs to be further radially expanded into the teeth as well as reduce the amount of friction between the wedge and the legs 43 and 44 as the wedge 45 is driven therebetween. When the thrust bearing 30 is assembled in place, its forward end surface 52 functions as a bearing surface for the armature shaft 14 and prevents axial end play of the armature shaft 14.

From the foregoing, it should be apparent that the present invention provides a novel thrust bearing 30 which can be rapidly positioned in place against the end 14a of an armature shaft 14 and which can be readily and rapidly locked in place relative to the housing to prevent axial end play of the armature shaft 14. It should also be apparent that the thrust bearing is of a relatively simple and economic construction, since no external threads need be provided thereon. It should also be apparent that the thrust bearing could be reset by merely removing the wedge 45 and repositioning the plug portion 40 and re-driving the wedge 45 between the legs 43 and 44.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

It is claimed:

1. A thrust bearing for engaging and setting the axial end position of an armature shaft of a dynamo-electric machine having a housing provided with a threaded opening having threads adjacent the end of the armature shaft comprising:
   a generally cylindrical plug which is adapted to be inserted within the threaded opening until its forward end thereof abuttingly engages the end of the armature shaft,
   said plug having a pair of spaced legs along its rearward portion which are separated by a through transverse slot, said legs having a curved outer peripheral surface and being spaced apart a given distance,
   a drivable wedge axially aligned with said slot and having a forward end portion integrally connected by fracturable webs to said legs adjacent their rearward ends,
   said wedge having a rearward end portion of a thickness greater than said given distance between said legs and a forward end portion which is tapered so that its transverse dimension progressively decreases proceeding from said rearward end portion towards said fracturable ribs,
   said webs being fracturable and said wedge being movable into said slot when an axial force in excess of a predetermined magnitude is exerted against the rearward end portion of the wedge to cause the legs of said plug to be moved radially outwardly whereby the threads of the threaded opening bite into and embed within the legs of said wedge to securely lock the bearing to the housing.

2. In a dynamo-electric machine having a rotatable armature shaft carrying a worm gear thereon, a housing means for surrounding said armature shaft and with the housing means being provided with the threaded opening having threads adjacent the end of the armature shaft at its free end and a thrust bearing secured within the threaded opening of said housing means for engaging and setting the axial end position of the armature shaft, the improvement being that said thrust bearing comprises a generally cylindrical plug which is adapted to be inserted through the threaded opening until its forward end abuttingly engages the end of the armature shaft,
   said plug being bifurcated along its rearward portion to define a pair of spaced legs which are separated by a through transverse slot, said legs having a curved outer peripheral surface and said legs having inner surfaces which are separated from each other by a given transverse distance,
   a drivable wedge axially aligned with said slot and having a forward end portion integrally connected by fracturable webs to said legs adjacent their rearward most ends,
   said wedge having a rearward end portion which has a thickness which is greater than the given distance between the inner surfaces of said legs and a forward end portion which is tapered so that its transverse dimension progressively decreases proceeding from said rearward end portion of said wedge towards said fracturable webs,
   said plug having tapered nibs extending inwardly into the slot from the inner surfaces of said legs,
   said webs being fracturable and said wedge being movable into said slot when an axial force of a predetermined magnitude is exerted against the rearward end portion of the wedge to cause said legs to be moved radially outwardly so that the threads of the threaded opening bite into and embed themselves within the legs whereby said insert is securely locked to the housing.

* * * * *